(12) United States Patent
Erbes et al.

(10) Patent No.: US 7,627,074 B2
(45) Date of Patent: Dec. 1, 2009

(54) VERTICAL SPRING WEDGE

(75) Inventors: John Erbes, Mountain View, CA (US); Thanh C. Tu, Hayward, CA (US); Mark William Broaddus, Rohnert Park, CA (US)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 11/585,183

(22) Filed: Oct. 24, 2006

(65) Prior Publication Data

US 2008/0137793 A1 Jun. 12, 2008

(51) Int. Cl.
*G21C 19/28* (2006.01)

(52) U.S. Cl. .................. 376/372; 376/407; 376/461; 411/78; 403/220; 292/177

(58) Field of Classification Search .................. 376/372, 376/407, 461; 411/78; 403/220; 292/177
See application file for complete search history.

(56) References Cited

U.S. PATENT DOCUMENTS

| | | | |
|---|---|---|---|
| 4,197,652 A * | 4/1980 | Qurnell et al. .................. 33/553 |
| 5,374,033 A * | 12/1994 | Tilman .................. 254/104 |
| 5,502,754 A | 3/1996 | Erbes |
| 5,521,951 A | 5/1996 | Charnley et al. |
| 5,530,219 A | 6/1996 | Offer et al. |
| 5,586,155 A | 12/1996 | Erbes et al. |
| 5,621,778 A | 4/1997 | Erbes |
| 5,675,619 A | 10/1997 | Erbes et al. |
| 5,683,216 A | 11/1997 | Erbes |
| 5,737,379 A | 4/1998 | Erbes |
| 5,742,653 A | 4/1998 | Erbes et al. |
| 5,752,807 A | 5/1998 | Erbes |
| 5,803,686 A | 9/1998 | Erbes et al. |
| 5,838,751 A | 11/1998 | Thompson et al. |
| 5,905,771 A | 5/1999 | Erbes et al. |
| 5,978,433 A | 11/1999 | Erbes et al. |
| 6,052,425 A | 4/2000 | Erbes et al. |
| 6,053,652 A | 4/2000 | Deaver et al. |
| 6,067,338 A | 5/2000 | Erbes |
| 6,236,700 B1 | 5/2001 | Erbes et al. |
| 6,343,107 B1 | 1/2002 | Erbes et al. |
| 6,394,765 B1 | 5/2002 | Erbes et al. |
| 6,434,208 B1 | 8/2002 | Erbes et al. |
| 6,435,839 B1 | 8/2002 | Erbes |
| 6,438,192 B1 | 8/2002 | Erbes et al. |
| 6,450,774 B1 | 9/2002 | Erbes et al. |
| 6,490,331 B2 | 12/2002 | Erbes |
| 6,587,535 B1 | 7/2003 | Erbes et al. |

(Continued)

*Primary Examiner*—Rick Palabrica
(74) *Attorney, Agent, or Firm*—Nixon & Vanderhye P.C.

(57) ABSTRACT

A vertical spring wedge restores a tight fitup against an adjacent structure, such as between an inlet mixer and an adjacent restrainer bracket in a boiling water nuclear reactor jet pump. The vertical spring wedge includes a U-shaped bracket including a pair of guiding portions and a pair of bracket holes. A pair of wedge assemblies are coupled with the bracket, each of the wedge assemblies including a wedge segment attached to a spring-loaded guide rod. The guide rods are displaceable in the bracket holes between a retracted position and an extended position. The wedge segments engage the guiding portions, and a combination of the bracket and wedge assemblies have a first width when the guide rods are in the retracted position and have a second width wider than the first width when the guide rods are in the extended position.

10 Claims, 4 Drawing Sheets

U.S. PATENT DOCUMENTS

| | | |
|---|---|---|
| 6,788,756 B2 | 9/2004 | Erbes |
| 6,932,117 B2 * | 8/2005 | Wensel et al. ................. 138/99 |
| 7,023,949 B2 * | 4/2006 | Wivagg ...................... 376/260 |
| 7,073,332 B2 * | 7/2006 | Butera et al. .................. 60/527 |
| 7,243,959 B2 * | 7/2007 | Wensel et al. ............... 285/420 |

* cited by examiner

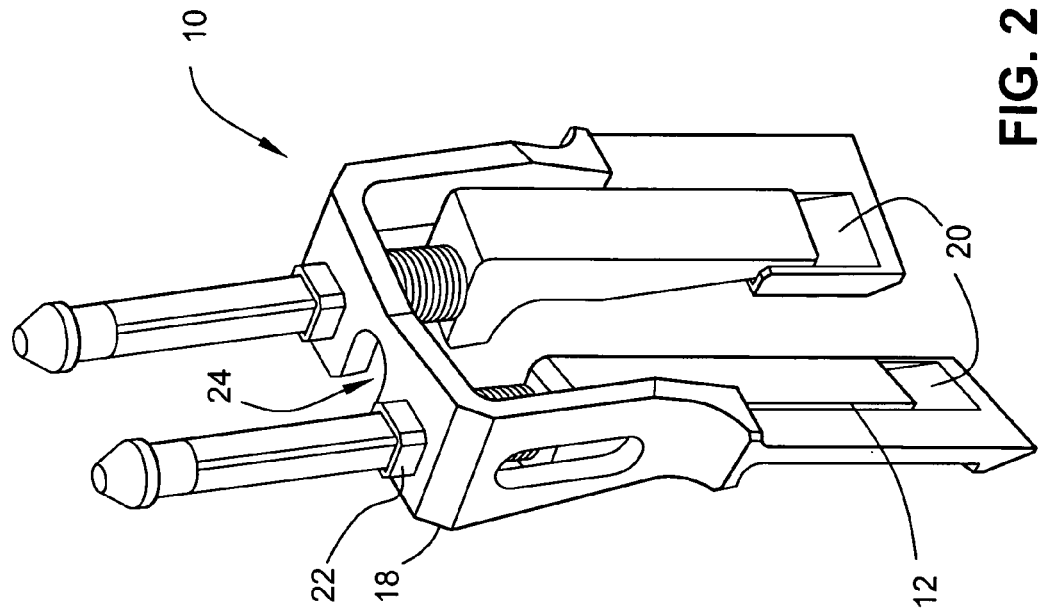
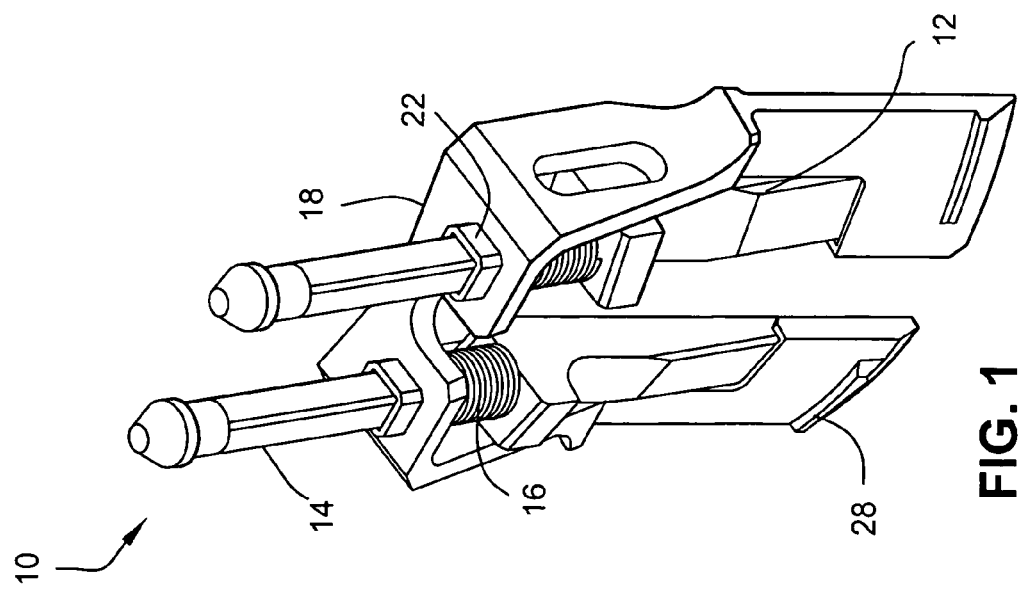

VERTICAL SPRING WEDGE

BACKGROUND OF THE INVENTION

The invention relates to an apparatus for restoring a tight fitup provided against an adjacent structure and, more particularly, to a compact remotely installable jet pump piping support device that restores the tight and rigid fitup originally provided between the inlet mixer and the adjacent restrainer bracket in a boiling water nuclear reactor jet pump.

In a boiling water nuclear reactor (BWR), hollow tubular jet pumps positioned within the shroud annulus provide the required reactor core flow. The upper portion (inlet mixer) is laterally positioned and supported against two opposing rigid set screw contacts within restrainer brackets by a gravity actuated wedge, intended to assure clearances do not occur at the supports.

The flow through and outside the jet pumps contains pressure fluctuations from various sources in the reactor system. The pressure fluctuations can have frequencies close to one or more natural vibration modes of the jet pump piping, which depend on the tight fitup of the restrainer bracket contacts, which support the inlet mixer from the jet pump riser pipe.

Operating thermal gradients, component alignment changes, hydraulic loads, and fluctuations in these loads can overcome the lateral support provided by the gravity wedge. These effects and/or loosening of the set screws due to failure of their securing tack welds can cause clearances to develop at the opposing two fixed set screw contacts. This loss of contact can change the jet pump natural frequency to match some excitation frequency in the system, causing vibration of the piping and exerting increased loads which have caused cyclic fatigue cracking and wear of the supports and their welded attachments. This can result in degradation from wear and fatigue at additional jet pump structural supports, to a degree which may require plant shutdown.

The apparatus described herein is intended for BWR/6 reactor designs, where the available installation clearance access can be as small as 0.25 inches in width, and where disassembly of the inlet mixer to allow wedge installation is to be avoided.

Over the last 19 years, General Electric has designed and installed both gravity and spring actuated wedge supports at locations where clearances have developed in restrainer bracket contacts. The gravity wedges (see, e.g., U.S. Pat. No. 6,052,425) employed a tapered sliding wedge and a fixed bracket mount which engaged the jet pump restrainer bracket. The earlier types of these designs required disassembly of the jet pumps to allow access for their installation, which was an undesirable expense and extension of the reactor outage time. The gravity wedges were applicable to restrainer bracket/inlet mixer gap widths from about 1.0 to 2.0 inches, as space was required for a wedge with sufficient weight to give the required support load.

General Electric also implemented spiral spring actuated wedge repairs (see, e.g., U.S. Pat. No. 6,490,331) for BWR/4 reactor designs, where the available installation clearance access can be as small as 0.60 inches in width, and where disassembly of the inlet mixer to allow wedge installation was avoided. While it was initially intended that this prior design would also be installable in the smaller access space for BWR/6 reactors, without disassembly of the inlet mixers, this proved too difficult.

Another solution which had limited application was to reinforce the welded attachment of the two fixed contacts to the restrainer bracket, then reseat the inlet mixer against the fixed contacts when the jet pump was reassembled.

BRIEF DESCRIPTION OF THE INVENTION

In an exemplary embodiment of the invention, a vertical spring wedge restores a tight fitup against an adjacent structure, such as between an inlet mixer and an adjacent restrainer bracket in a boiling water nuclear reactor jet pump. The vertical spring wedge includes a U-shaped bracket including a pair of guiding portions and a pair of bracket holes. A pair of wedge assemblies are coupled with the bracket, each of the wedge assemblies including a wedge segment attached to a spring-loaded guide rod. The guide rods are displaceable in the bracket holes between a retracted position and an extended position. The wedge segments engage the guiding portions, and a combination of the bracket and wedge assemblies have a first width when the guide rods are in the retracted position and have a second width wider than the first width when the guide rods are in the extended position.

In another exemplary embodiment of the invention, a method of restoring a tight fitup between an inlet mixer and an adjacent restrainer bracket in a boiling water nuclear reactor jet pump includes the steps of pulling the guide rods against the spring-load to the retracted position; inserting the vertical spring wedge into a gap between the inlet mixer and the restrainer bracket; and releasing the guide rods, wherein the spring-load urges the guide rods toward the extended position.

BRIEF DESCRIPTION OF THE DRAWINGS

FIGS. 1 and 2 are perspective views of the vertical spring wedge with the guide rods in a retracted position;

DETAILED DESCRIPTION OF THE INVENTION

Figure 4:
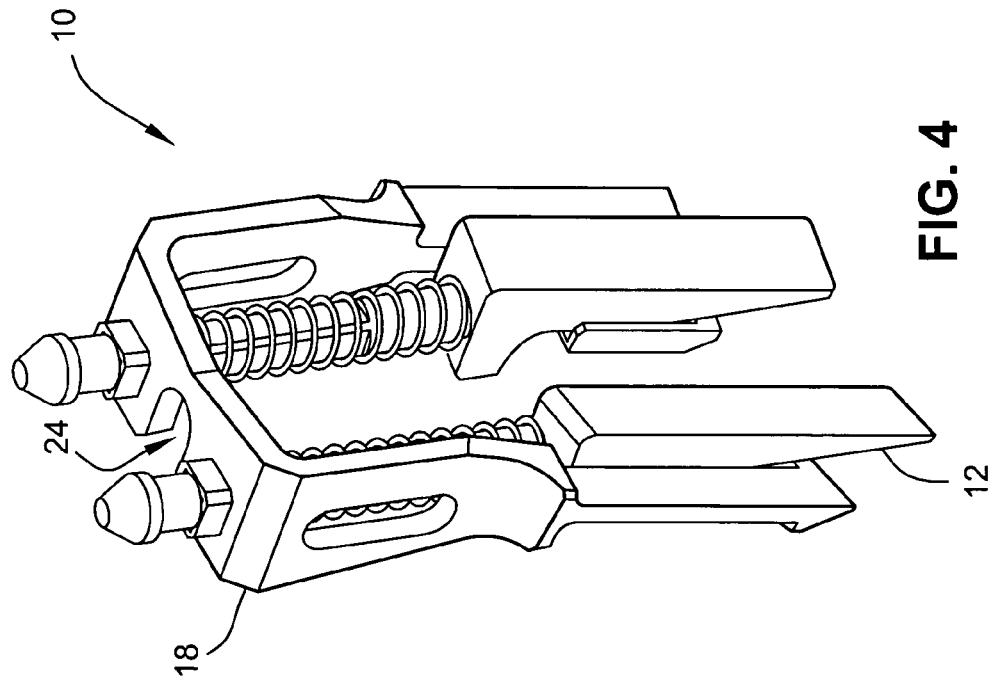
FIGS. 3 and 4 are perspective views with the guide rods in an extended position.

The vertical spring wedge 10 described herein generally includes a pair of tapered wedge segments 12 attached to respective guide rods 14 with pre-load springs 16, all of which are mounted within a U-shaped bracket 18. The assembly 10 has a compact configuration to fit within the limited radial space between an inlet mixer IM and a restrainer bracket RB in a boiling water nuclear reactor jet pump (see FIG. 7).

Figure 3:
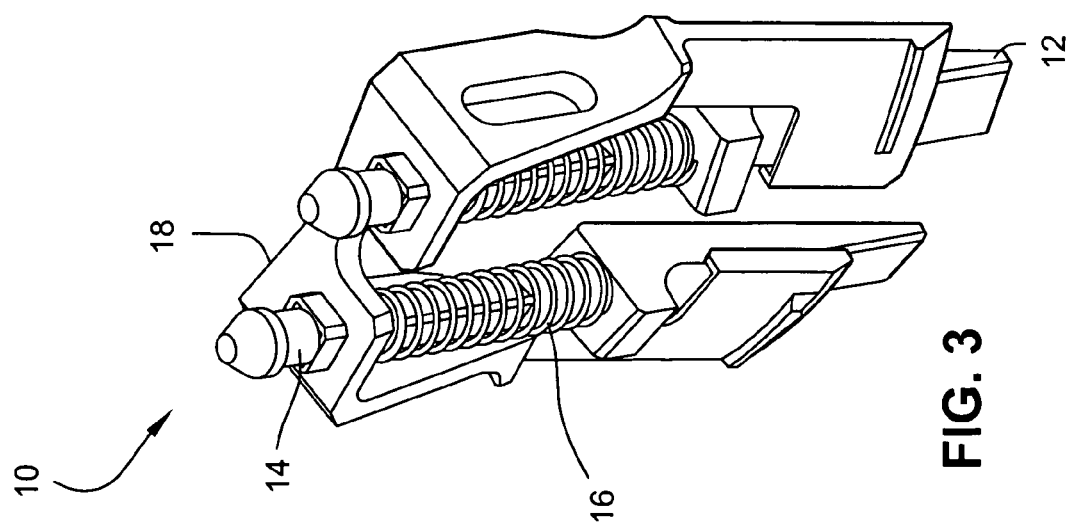
Figure 6:
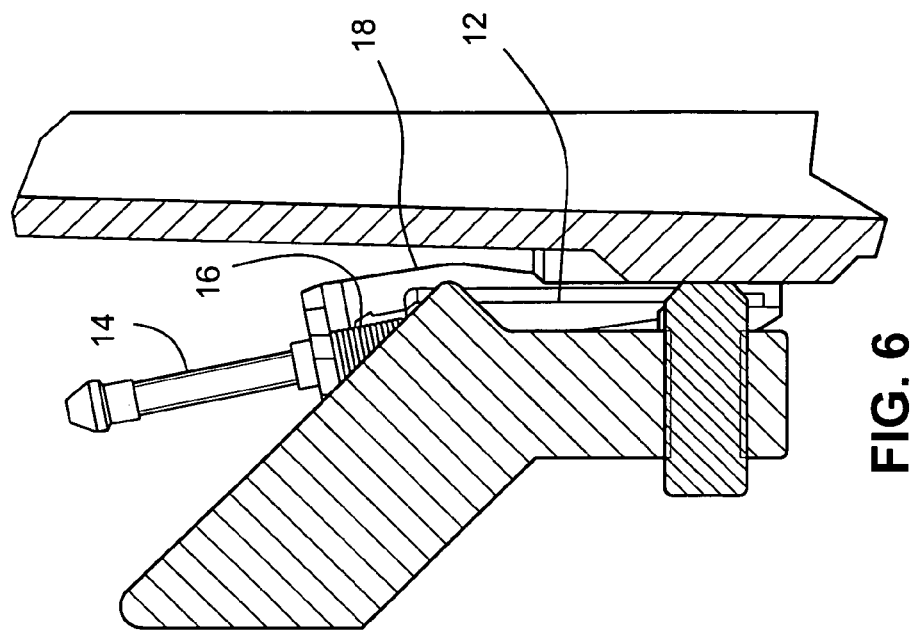
FIGS. 5 and 6 show the vertical spring wedge installed between the inlet mixer and the adjacent restrainer bracket in a jet pump with the guide rods in the retracted position.
Figure 5:
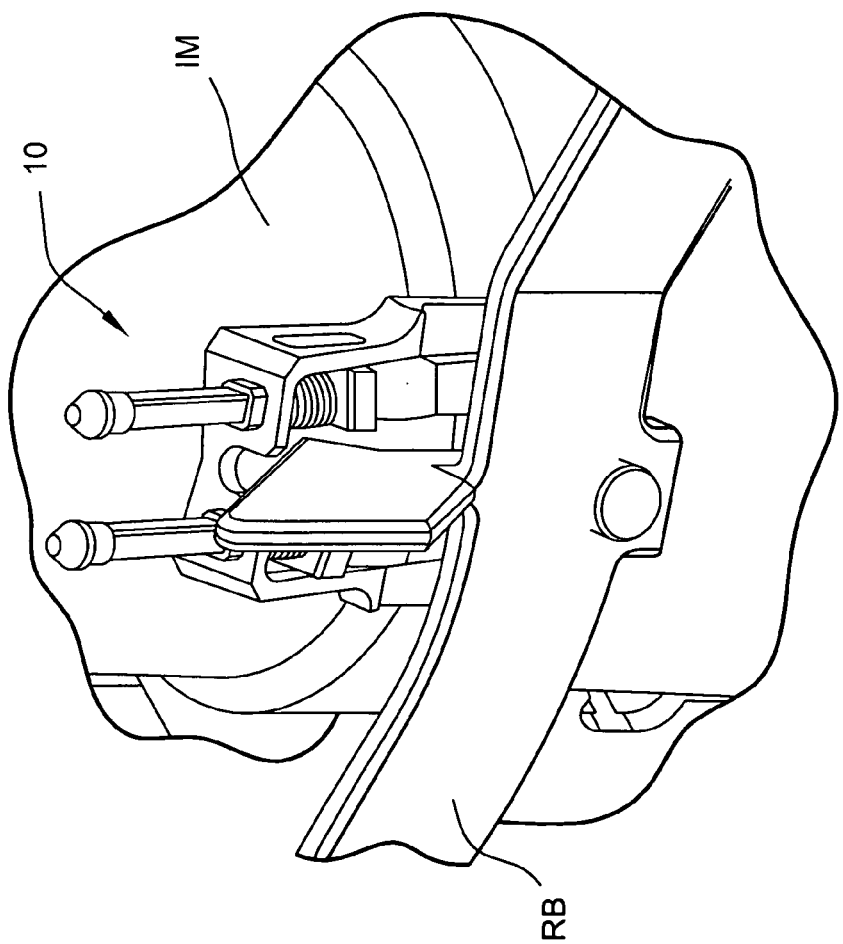

As shown, the springs 16 are mounted on the guide rods 14 between the bracket 18 and the wedge segment 12. With the guide rods 14 in a retracted position (FIGS. 1 and 2), a pre-load force of the springs acts to drive the guide rods 14 toward an extended position (FIGS. 3 and 4).

The springs 16 are preferably helical coil springs. The spring pre-load provides wedge segment seating force, as was previously provided by the weight of the larger wedge in previous gravity wedge designs. As a result, when the wedge assembly is installed in the nominal aligned position, each spring 16 is compressed to provide about six pounds pre-load to force the mating wedge segments 12 into engagement. The spring pre-load of the wedge acting across the shallow angled wedge surfaces maintains rigid contact between the inlet mixer and the restrainer bracket. The wedge also takes up the clearance from wear during operation.

The vertical legs of the bracket 18 include tapered guiding portions 20 as shown in FIG. 2. The guiding portions 20 guide and react against the wedge segments 12, wherein the wedge segments 12 and the guiding portions 20 are tangentially offset to minimize a tool radial thickness of the assembly.

Figure 8:
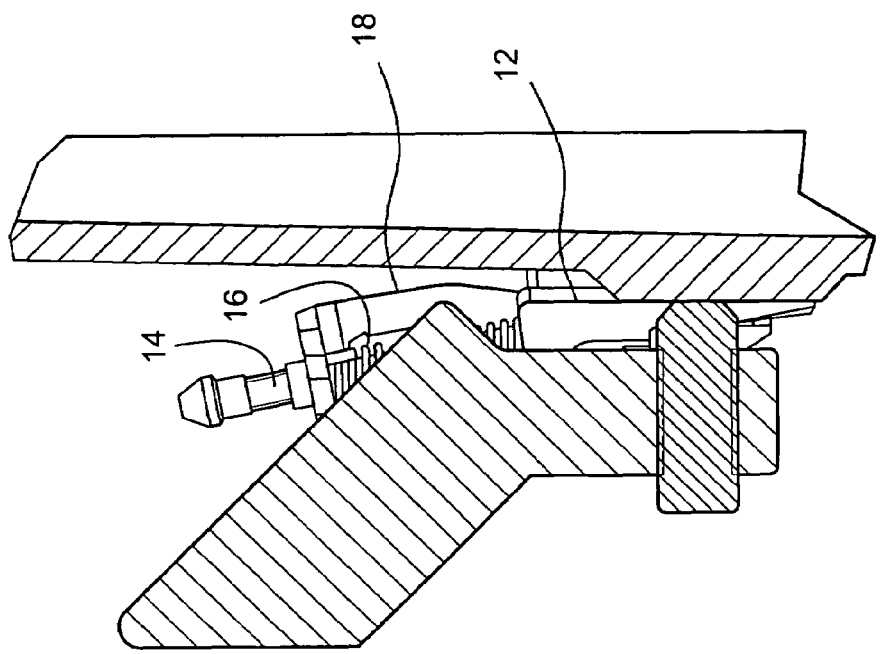
FIGS. 7 and 8 show the vertical spring wedge installed in the gap with the guide rods in the extended position.
Figure 7:
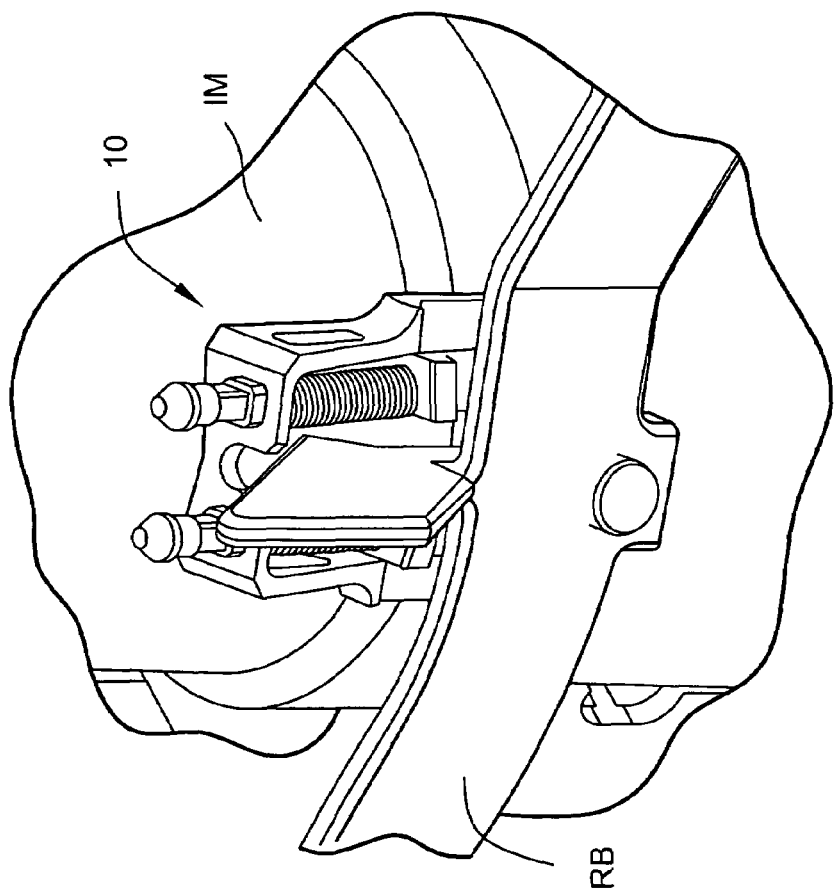

With reference to FIGS. 7 and 8, the bracket 18 is open in its center to fit around the existing restrainer bracket set screw and guide ear features, which also maintain the vertical orientation of the wedge 10. Additionally, the bracket 18 has a relief slot 24 at the top that straddles the restrainer bracket guide ear, and projecting lips 28 (FIG. 1) that engage the bottom of the restrainer bracket to further assure that the vertical orientation of the assembly is maintained.

The wedge segments 12 are machined with a 10° slope angle between their sliding surfaces, which is consistent with the previous gravity wedges described above. This angle has been found by testing and operating experience to provide a tightly sealed fitup that gives a rigid load path between the parts, without being so shallow that friction results in self-locking of the wedge adjusted motion. The guiding portions 20 of the bracket 18 preferably include 10° sloped guide slots to which the wedge segments 12 seat against.

The guide rods 14 are preferably attached to the wedge segments 12 by a threaded engagement, oriented parallel to the 10° wedge surfaces. A portion of the upper length of each guide rod 14 has a square cross section and fits within a mating square hole 22 in the top or cross member of the bracket 18. The guide rod 14 and wedge segments 12 are locked against rotation at assembly by inserting a pin into a hole drilled in both parts to assure that no parts can become loose.

The sliding fit between the guide rods 14 and the bracket holes 22 and between the wedge segments 12 and the mating bracket surfaces or guiding portions 20 guide the wedges within the bracket along the 10° sloped axis. The sliding fitup also maintains relative alignment of the parts during handling, until the wedge is installed.

From the retracted position as shown in FIGS. 1 and 2, as the wedges are displaced downward by action of the springs 16, the combined width of the wedge segments and bracket 18 increases to thereby tighten within the space between the inlet mixer and the restrainer bracket.

The initial wedge thickness is machined before assembly, based on inspection measurements of the existing set screw protrusion, to assure that the wedge is installed with a useful operating pre-load range. The gravity wedges typically weighed 5-10 pounds, so an initial twelve pound total spring force on a 10° slope reacts against the projecting lips to allow the wedges to compensate for an increase in the gap of about 0.12 inches while maintaining the minimum pre-load previously used.

Preferably, the wedge assembly 10 is installed using a collet tool, which grips the tops of the wedge guide rods 14. The tool pulls the guide rods 14 upward against the bracket 18, compressing the springs 16. As the wedge is displaced upward, the combined width of the wedge segment 12 and bracket 18 decreases, such as to allow installation clearance in the space between the inlet mixer and the restrainer bracket. The assembly is lowered into the restrainer bracket/inlet mixer gap, and the collet tool is released. The wedge segments 12 locate against either side of the set screw at installation, keeping the wedge assembly in position.

The vertical spring wedge described herein restores the tight and rigid fitup originally provided between the inlet mixer and the adjacent restrainer bracket in a boiling water nuclear reactor jet pump, replacing the support function of an existing screw type contact. It provides continuous adjustment for possible alignment variation of the mixer, and compensates for possible wear after installation. The device is remotely installable in a clearance width as small as 0.25 inches and requires minimum installation time, without disassembly of the jet pump. It is also configured with a minimum of weight and height to be supported above the engagement between the inlet mixer and the restrainer bracket, which assures that the vibration frequencies of the assembly are enough higher than the jet pump excitation frequencies that resonance and fatigue failure are avoided. Provision of two independently pre-loaded wedges provides tight fitup on both sides of the set screw to compensate for the positioning of the inlet mixer within the restrainer bracket, which is generally not symmetrical.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vertical spring wedge for restoring a tight fitup against an adjacent structure, the vertical spring wedge comprising:
    a U-shaped bracket including a pair of guiding portions and a pair of bracket holes, the guiding portions defining a width dimension and a length dimension of the bracket in a width/length plane; and
    a pair of wedge assemblies coupled with the bracket, each of the wedge assemblies including a wedge segment attached to a spring-loaded guide rod, the guide rods being disposed in the bracket holes and displaceable in the bracket holes between a retracted position and an extended position,
    wherein the wedge segments engage the guiding portions, and wherein the bracket and wedge assemblies are structurally configured to have a first width in a thickness plane perpendicular to the width/length plane when the guide rods are in the retracted position and to have a second width in the thickness plane wider than the first width when the guide rods are in the extended position.

2. A vertical spring wedge according to claim 1, wherein the spring-loaded guide rods each comprise a spring secured between the bracket and the wedge segment.

3. A vertical spring wedge according to claim 2, wherein with the guide rods in the retracted position, a pre-load force of the springs acts to drive the guide rods toward the extended position.

4. A vertical spring wedge according to claim 3, wherein the pre-load force for each spring is about 6 lbs.

5. A vertical spring wedge according to claim 1, wherein each of the guiding portions comprises a tapered section engageable with the wedge segments such that the wedge segments and the guiding portions are tangentially offset.

6. A vertical spring wedge according to claim 1, wherein the wedge segments comprise a slope angle of about 10 degrees.

7. A vertical spring wedge according to claim 1, wherein the first width is defined such that the vertical spring wedge is remotely installable in a clearance width as small as 0.25 inches.

8. A vertical spring wedge according to claim 1, wherein the tight fitup is between an inlet mixer and an adjacent restrainer bracket in a boiling water nuclear reactor jet pump, and wherein the bracket comprises a relief slot between the bracket holes for accommodating a guide ear of the restrainer bracket.

9. A vertical spring wedge according to claim 8, wherein the guiding portions are spaced a sufficient distance to accommodate a set screw of the restrainer bracket.

10. A vertical spring wedge for restoring a tight fitup against an adjacent structure, the vertical spring wedge comprising:

a U-shaped bracket including bracket legs and a cross member that define a width dimension and a length dimension of the bracket in a width/length plane, the bracket comprising a pair of tapered guiding portions on the bracket legs and a pair of bracket holes in the cross member; and a pair of wedge assemblies coupled with the bracket, each of the wedge assemblies including a wedge segment attached to a spring-loaded guide rod, the guide rods being disposed in the bracket holes and displaceable in the bracket holes between a retracted position and an extended position, wherein the wedge segments engage the guiding portions, and wherein the bracket and wedge assemblies are structurally configured to have a first width in a thickness plane perpendicular to the width/length plane when the guide rods are in the retracted position and have a second width in the thickness plane wider than the first width when the guide rods are in the extended position.

\* \* \* \* \*